US011383668B1

(12) United States Patent
Faruque et al.

(10) Patent No.: US 11,383,668 B1
(45) Date of Patent: Jul. 12, 2022

(54) SEAT BOTTOM SUPPORTED AIRBAGS EXTENDING CROSS-VEHICLE BETWEEN VEHICLE SEATS

(71) Applicant: Ford Global Technologies, LLC, Dearborn, MI (US)

(72) Inventors: Mohammad Omar Faruque, Ann Arbor, MI (US); Dean M. Jaradi, Macomb, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/392,621

(22) Filed: Aug. 3, 2021

(51) Int. Cl.
*B60R 21/207* (2006.01)
*B60N 2/01* (2006.01)
*B60R 21/231* (2011.01)
*B60R 21/16* (2006.01)

(52) U.S. Cl.
CPC ............ *B60R 21/207* (2013.01); *B60N 2/012* (2013.01); *B60R 2021/161* (2013.01); *B60R 2021/23107* (2013.01); *B60R 2021/23161* (2013.01)

(58) Field of Classification Search
None
See application file for complete search history.

(56) References Cited

U.S. PATENT DOCUMENTS

| 10,773,678 B2 | 9/2020 | Markusic |
| 2015/0076801 A1 | 3/2015 | Fujiwara |
| 2020/0010040 A1 * | 1/2020 | Nakamura ............ B60R 21/207 |

FOREIGN PATENT DOCUMENTS

| CN | 107054269 A | * | 8/2017 | ............. B60N 2/143 |
| DE | 10256024 A1 | * | 6/2004 | ............. B60R 21/214 |
| JP | 2008265472 A | * | 11/2008 | |
| JP | 2008265472 A | | 11/2008 | |
| JP | 2016088413 A | * | 5/2016 | |

* cited by examiner

*Primary Examiner* — Faye M Fleming
(74) *Attorney, Agent, or Firm* — Frank A. MacKenzie; Bejin Bieneman PLC (57) ABSTRACT

An assembly for a vehicle includes an assembly for a vehicle including a first seat, a second seat, and a third seat spaced from the second seat along a vehicle-longitudinal axis. The second seat and the third seat are spaced cross-vehicle from the first seat. Each of the second seat and the third seat define an occupant seating area. The occupant seating area of the second seat faces the occupant seating area of the third seat. The assembly includes an airbag supported by the first seat. The airbag extends from the first seat and is inflatable cross-vehicle between the occupant seating area of the second seat and the occupant seating area of the third seat.

17 Claims, 6 Drawing Sheets

SEAT BOTTOM SUPPORTED AIRBAGS EXTENDING CROSS-VEHICLE BETWEEN VEHICLE SEATS

BACKGROUND

A vehicle may include amenities that allow occupants to face one another during operation of the vehicle. As one example, an autonomous vehicle may be autonomously operated, allowing occupants of the vehicle to ride in the vehicle without monitoring the operation of the vehicle. Specifically, the autonomous vehicle may include seats free to rotate between rides of the vehicle between forward-facing and rearward-facing positions. The vehicle be equipped with airbags located at various fixed positions in the passenger compartment to inflate in the event of impacts to the vehicle. Vehicles may include airbags supported on a dash, side air curtains mounted to the roof rails, side airbags mounted to seats, etc.

DETAILED DESCRIPTION

An assembly includes an assembly for a vehicle including a first seat, a second seat, and a third seat spaced from the second seat along a vehicle-longitudinal axis. The second seat and the third seat are spaced cross-vehicle from the first seat. Each of the second seat and the third seat define an occupant seating area. The occupant seating area of the second seat faces the occupant seating area of the third seat. The assembly includes an airbag supported by the first seat. The airbag extends from the first seat and is inflatable cross-vehicle between the occupant seating area of the second seat and the occupant seating area of the third seat.

The first seat may include a seat bottom, the airbag being supported by the seat bottom of the first seat.

The seat bottom may include a vehicle-inboard side and a vehicle-outboard side spaced cross-vehicle from the vehicle-inboard side, the airbag being supported by the vehicle-inboard side of the seat bottom of the first seat.

The assembly may include a fourth seat spaced along the vehicle-longitudinal axis from the first seat and spaced cross-vehicle from the second seat and third seat, the fourth seat and the first seat each defining an occupant seating area. The occupant seating area of the fourth seat may face the occupant seating area of the first seat. The assembly may include a second airbag supported by the third seat, the second airbag may extend from the third seat and being inflatable cross-vehicle between the occupant seating area of the fourth seat and the occupant seating area of the first seat.

The airbag and the second airbag may be each inflatable to an inflated position, the second airbag may abut the airbag in the inflated position.

The second airbag may extend in a direction opposite from the airbag.

The airbag may be supported by the first seat below the occupant seating area.

The assembly may include a second airbag supported by the first seat, the second airbag being spaced cross-vehicle from the airbag and inflatable to an inflated position. The assembly may include a computer including a processor and a memory storing instructions executable by the processor to selectively inflate the airbag or the second airbag.

The first seat may be rotatable about a rotational axis from a forward-facing position to a rearward-facing position and the instructions include to inflate the airbag to an inflated position when the first seat is in one of the forward-facing position or the rearward-facing position and to inflate the second airbag to the inflated position when the first seat is the other of the forward-facing position or rearward-facing position.

The assembly may include a third airbag supported by the third seat.

The assembly may include a fourth seat spaced along the vehicle-longitudinal axis from the first seat and spaced cross-vehicle from the second seat and third seat. The first seat and the fourth seat each defining an occupant seating area, the occupant seating area of the fourth seat facing the occupant seating area of the first seat. The third airbag may extend from the third seat and being inflatable cross-vehicle between the occupant seating area of the fourth seat and the occupant seating area of the first seat.

The assembly may include a deflector supported by the first seat adjacent the airbag.

The airbag may be inflatable to an inflated position, the airbag abutting at least one of the second seat and the third seat in the inflated position.

The assembly may include a door adjacent the second seat and the third seat, the airbag being inflatable to an inflated position away from the first seat and toward the door.

The airbag may abut the door in the inflated position.

The airbag may inflate diagonally from the first seat.

The first seat may include a seat bottom and a seatback supported by the seat bottom, the airbag being supported by the seat bottom and being inflatable upwardly from the seat bottom and above the seatback.

With reference to the Figures, wherein like numerals indicate like parts throughout the several views, an assembly 10 for a vehicle 12 includes a first seat 14, a second seat 16, and a third seat 18 spaced from the second seat 16 along a vehicle-longitudinal axis L. The second seat 16 and the third seat 18 are spaced cross-vehicle from the first seat 14. Each of the second seat 16 and the third seat 18 define an occupant seating area 20. The occupant seating area 20 of the second seat 16 faces the occupant seating area 20 of the third seat 18. The assembly 10 includes an airbag 22 supported by the first seat 14. The airbag 22 extends from the first seat 14 and is inflatable cross-vehicle between the occupant seating area 20 of the second seat 16 and the occupant seating area 20 of the third seat 18.

In the event of an impact to the vehicle 12, e.g., a frontal, rear, offset impact, etc., the airbag 22 supported by the first seat 14 inflates to an inflated position. The airbag 22 inflates cross-vehicle between the occupant seating area 20 of the second seat 16 and the occupant seating area 20 of the third seat 18. The airbag 22 may control the kinematics of the occupants seated in the second seat 16 and the third seat 18. The airbag 22 may limit interaction between the occupants seated in the second seat 16 and the third seat 18. The airbag 22 may limit interaction between the occupants of the second seat 16 and the third seat 18 and occupants seated in other seats 14, 16, 18, 24 of the vehicle 12, e.g., an occupant of the first seat 14. The airbag 22 may be inflated in the vehicle 12 in combination with other airbags in the vehicle 12, e.g., a curtain airbag, side airbag, etc.

Figure 1:
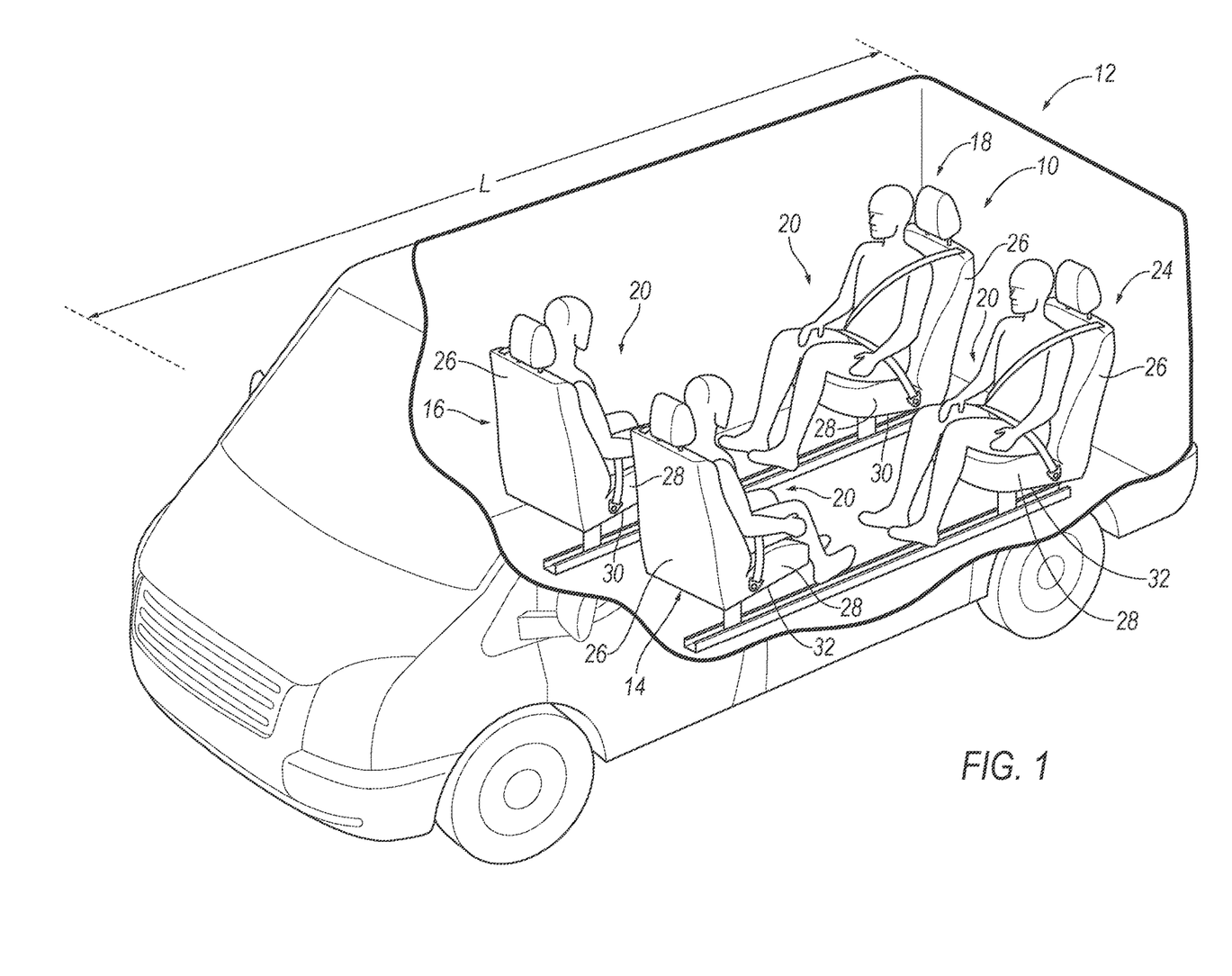
FIG. 1 is a perspective view of a vehicle having a plurality of seats.
Figure 2:
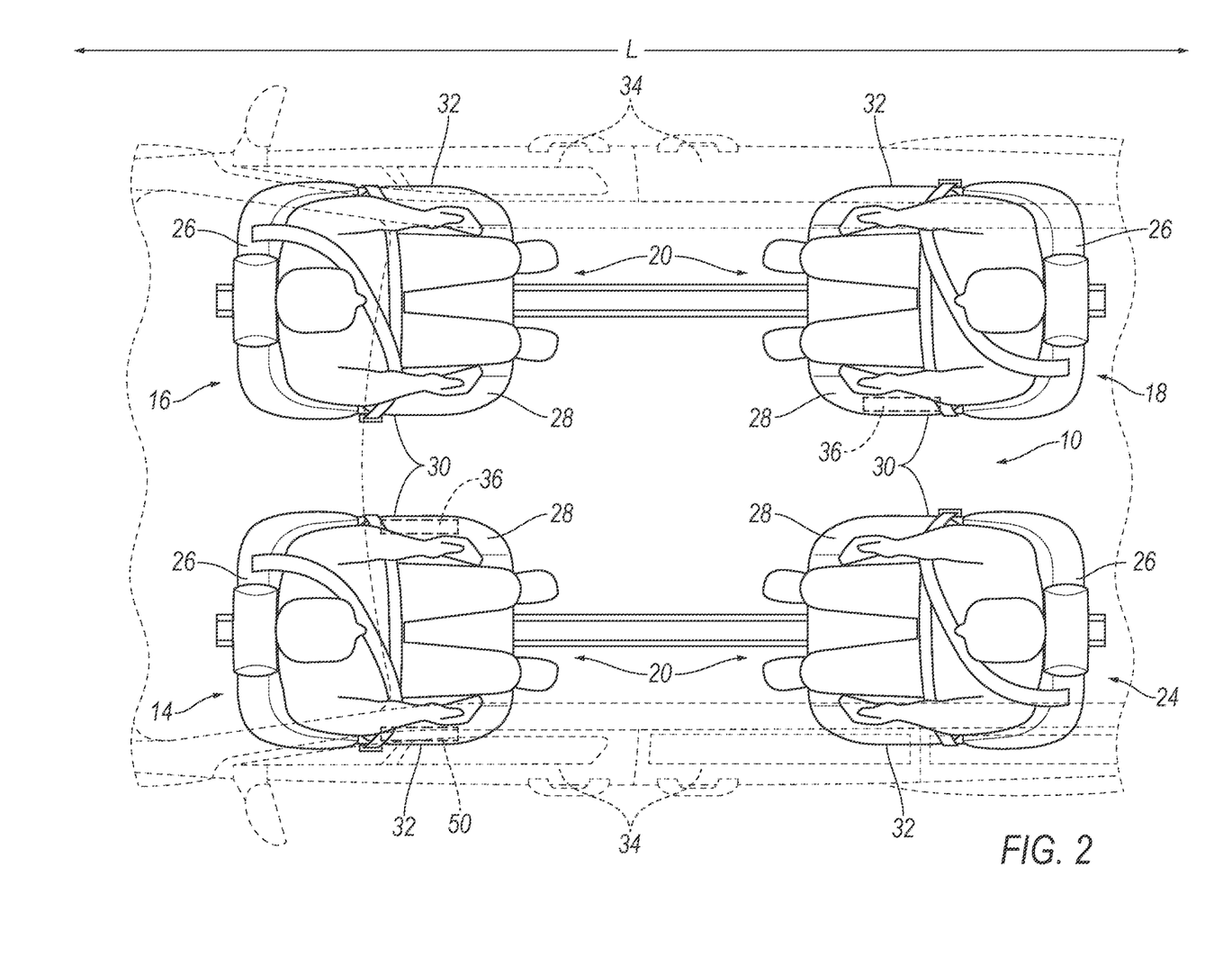
FIG. 2 is a plan view of the vehicle having the plurality of seats having seat bottoms and a plurality of airbag assemblies supported by the seat bottoms in uninflated positions.

With reference to FIG. 1, the vehicle 12 may be any suitable type of automobile, e.g., a passenger or commercial automobile such as a sedan, a coupe, a truck, a sport utility, a crossover, a van, a minivan, a taxi, a bus, etc. The vehicle 12, for example, may be autonomous.

In other words, the vehicle 12 may be autonomously operated such that the vehicle 12 may be driven without constant attention from a driver, i.e., the vehicle 12 may be self-driving without human input.

The vehicle 12 includes a body (not numbered) including rockers, roof rails, pillars, body panels, etc. The vehicle 12 includes a passenger compartment (not numbered) to house occupants, if any, of the vehicle 12. The passenger compartment may extend across the vehicle 12, i.e., from one side to the other side of the vehicle 12. The passenger compartment includes a front end and a rear end with the front end being in front of the rear end during forward movement of the vehicle 12.

With continued reference to FIG. 1, the vehicle 12 may include one or more seats 14, 16, 18, 24. Specifically, the vehicle 12 may include any suitable number of seats 14, 16, 18, 24. In the example shown in the Figures, the vehicle 12 includes the first seat 14, the second seat 16, the third seat 18, and a fourth seat 24. As shown in the Figures, the seats 14, 16, 18, 24 are positioned in a rectangular configuration. The first seat 14 and the fourth seat 24 are spaced from each other along a vehicle-longitudinal axis L. The second seat 16 and the third seat 18 are spaced from each other along the vehicle-longitudinal axis L. The first seat 14 and fourth seat 24 are spaced cross-vehicle from the second seat 16 and the third seat 18. In the example shown in the figures, the first seat 14 is positioned at a front left position of the passenger compartment merely as an example.

As shown in the Figures, the seats 14, 16, 18, 24 are supported by a vehicle floor (not numbered). The seats 14, 16, 18, 24 may be arranged in any suitable arrangement in the passenger compartment. As in the example shown in the Figures, one or more of the seats 14, 16, 18, 24 may be at the front end of the passenger compartment, e.g., a driver seat and/or a passenger seat. In other examples, one or more of the seats 14, 16, 18, 24 may be behind the front end of the passenger compartment, e.g., at the rear end of the passenger compartment. The first seat 14 may be positioned at any suitable location in the passenger compartment and the adjectives "first," "second," "third," and "fourth" with respect to the seats are merely identifiers and do not indicate order or importance. The seats 14, 16, 18, 24 may be movable relative to the vehicle 12 floor to various positions, e.g., movable fore-and-aft and/or cross-vehicle. The seat may be of any suitable type, e.g., a bucket seat.

The seats 14, 16, 18, 24 each include a seatback 26, a seat bottom 28, and a head restraint (not numbered). The head restraint may be supported by and extending upwardly from the seatback 26. The head restraint may be stationary or movable relative to the seatback 26. The seatback 26 may be supported by the seat bottom 28 and may be stationary or movable relative to the seat bottom 28. The seatback 26, the seat bottom 28, and the head restraint may be adjustable in multiple degrees of freedom. Specifically, the seatback 26, the seat bottom 28, and the head restraint may themselves be adjustable. In other words, adjustable components within the seatback 26, the seat bottom 28, and the head restraint may be adjustable relative to each other.

The seatback 26 includes the seat frame (not numbered) and a covering (not numbered) supported on the seat frame. The seat frame may include tubes, beams, etc. The seat frame may be of any suitable plastic material, e.g., carbon fiber reinforced plastic (CFRP), glass fiber-reinforced semi-finished thermoplastic composite (organosheet), etc. As another example, some or all components of the seat frame may be formed of a suitable metal, e.g., steel, aluminum, etc.

The covering may include upholstery, padding, and/or plastic portions. The upholstery may be cloth, leather, faux leather, or any other suitable material. The upholstery may be stitched in panels around the seat frame. The padding may be between the covering and the seat frame and may be foam or any other suitable material.

Each seat may be rotatable about a rotational axis (not numbered) that extends through the vehicle roof and the vehicle floor. For example, the seats 14, 16, 18, 24 may rotate between a forward-facing position and a rearward-facing position. In the forward-facing position, an occupant of the seat faces the front end of the passenger compartment. In the rearward-facing position, an occupant of the seat faces the rear end of the passenger compartment. The seats 14, 16, 18, 24 may rotate completely, i.e., 360°, about the axis. The seats 14, 16, 18, 24 may rotate between fixed positions, e.g., the forward-facing position and the rearward-facing position, or may be rotatable to an infinite number of positions.

The seat bottom 28 includes a vehicle-inboard side 30 and a vehicle-outboard side 32 spaced cross-vehicle from the vehicle-inboard side 30. When the seats 14, 16, 18, 24 are in the forward-facing position or in the rearward-facing position, the vehicle-outboard side 32 is facing the vehicle-outboard side 32 and the vehicle-inboard side 30 is facing vehicle-inboard. In other words, the vehicle-inboard side 30 and the vehicle-outboard side 32 may change depending on the orientation of the seat.

The seatback 26 and the seat bottom 28 define the occupant seating areas 20 of the seats 14, 16, 18, 24. Each of the seats 14, 16, 18, 24, i.e., the first seat 14, second seat 16, third seat 18, and the fourth seat 24, include an occupant seating area 20. The occupant seating area 20 is the area occupied by an occupant when properly seated on the seat bottom 28 and the seat back. The occupant seating area 20 is in a seat-forward direction of the seatback 26 and above the seat bottom 28. In the example shown in the Figures, the occupant seating area 20 faces the front end of the passenger compartment when the seat is in the forward-facing position and the occupant seating area 20 faces the rear end of the passenger compartment when the seat is in the rearward-facing position.

As shown in the example of FIGS. 1-4, when the first seat 14 is in the rearward-facing position and the fourth seat 24 is in the forward-facing position, the occupant seating areas 20 of the first seat 14 and the fourth seat 24 face each other. In other words, the occupant seating areas 20 of the first seat 14 and the fourth seat 24 are between the seatbacks 26 of the first seat 14 and the fourth seat 24. Also in the example of FIGS. 1-4, the second seat 16 is in the rearward-facing position and the third seat 18 is in the forward-facing position and the occupant seating areas 20 of the first seat 14 and the fourth seat 24 face each other. As shown in the example of FIG. 5, both the first seat 14 and the fourth seat 24 are in the forward-facing position and the occupant seating areas 20 are facing vehicle-forward.

The vehicle 12 includes a plurality of doors 34 openable for vehicle occupants to enter and exit the passenger compartment. Each of the doors 34 are adjacent a seat 14, 16, 18, 24 in the vehicle 12. The doors 34 may be adjacent seats 14, 16, 18, 24 in the passenger compartment. The doors 34 are vehicle-outboard the seats 14, 16, 18, 24.

The roof rails contact a top edge of the doors 34 when the doors 34 are closed. Each door 34 includes at least one door panel (not numbered) and the door-trim panel (not numbered) supported on the door panel. Specifically, the door 34 may include two panels, namely a door inner (not shown) and a door outer (not shown). In such an example, the door-trim panel and the door outer are fixed to the door inner. The door-trim panel is positioned opposite the door outer relative to the door frame. The door-trim panel is inboard relative to the door inner, and the door outer is outboard relative to the door inner. The doors 34 includes a window opening (not numbered) that may be completely closed by a window (not numbered) of the window is in a fully raised position. The window opening is defined by the door-trim panel and door outer on a bottom edge and either by the door inner circumscribing the window opening or by the body, e.g., the A pillar, the B pillar, and the roof rail. The door outer faces outboard relative to the vehicle 12.

The door outer may define a portion of the exterior of the vehicle 12. For example, the door outer may present a class-A surface, i.e., a surface specifically manufactured to have a high-quality, finished aesthetic appearance free of blemishes. The door outer may be metal (such as steel, aluminum, etc.) or polymeric (such as fiber reinforced plastic composite, etc.).

The door inner may be metal (such as steel, aluminum, etc.) or polymeric (such as fiber reinforced plastic composite, etc.). The door inner provides structural rigidity for the door outer. The door inner may provide a mounting location for components of the door 34.

The door-trim panel may include a covering supported by the top roll. The covering may include upholstery, padding, etc. The upholstery may be cloth, leather, faux leather, or any other suitable material. The upholstery may be stitched in panels around the top roll. The padding may be between the covering and the top roll and may be foam or any other suitable material. The door-trim panel may be a material suitable for an interior of the vehicle 12, such as vinyl, plastic, leather, wood, etc.

The door-trim panel may be a material suitable for an interior of the vehicle 12, such as vinyl, plastic, leather, wood, etc.

With reference to FIGS. 2-5, one or more of the seats 14, 16, 18, 24 may include an airbag assembly 36. Specifically, in the example shown in the Figures, the first seat 14 and the third seat 18 each include one or more airbag assemblies 36. Each of the airbag assemblies 36 includes the airbag 22, an inflator 38, and may include a housing (not shown). The vehicle 12 may include any suitable number of airbag assemblies 36. In examples including more than one airbag assembly 36, the airbag assemblies 36 may be identical or substantially identical to each other.

The inflator 38 of the airbag assembly 36 is fluidly connected to the airbags 22. The inflator 38 expands the airbags 22 with inflation medium, such as a gas, to move the airbag 22 from an uninflated position to the inflated position. The inflator 38 may be, for example, a pyrotechnic inflator that ignites a chemical reaction to generate the inflation medium, a stored gas inflator that releases (e.g., by a pyrotechnic valve) stored gas as the inflation medium, or a hybrid. The vehicle 12 may include any suitable number of inflators 38 to inflate the airbags 22 of the airbag assemblies 36. In other words, the vehicle 12 may include a number of inflators 38 equal to the number of airbag assemblies 36 supported by the first seat 14 and the third seat 18.

In the example shown in FIGS. 2-5, the airbag assemblies 36 may be supported by the seat bottom 28 of the first seat 14 and the seat bottom 28 of the third seat 18. Specifically, the airbag assemblies 36 are supported by the seat bottom 28 below the occupant seating areas 20 of the first seat 14 and the third seat 18. The airbag assemblies 36 may be supported by any combination of the seats 14, 16, 18, 24 and the vehicle 12 may include any suitable number of airbag assemblies 36.

The airbag assemblies 36, e.g., the airbags 22, may be supported by the seat bottom 28 of the first seat 14 and the third seat 18. Specifically, as shown in FIGS. 1-5, the airbags 22 are supported by the vehicle-inboard sides 30 of the first seat 14 and the third seat 18. In the example shown in FIGS. 1-4, the first seat 14 is in the rearward-facing position and the third seat 18 is in the forward-facing position and the airbags 22 are supported on the vehicle-inboard sides 30 of the seat bottoms 28, i.e., the first seat 14 and the third seat 18 are facing each other with the airbags 22 supported by the vehicle-inboard sides 30 of the seat bottoms 28.

Figure 3:
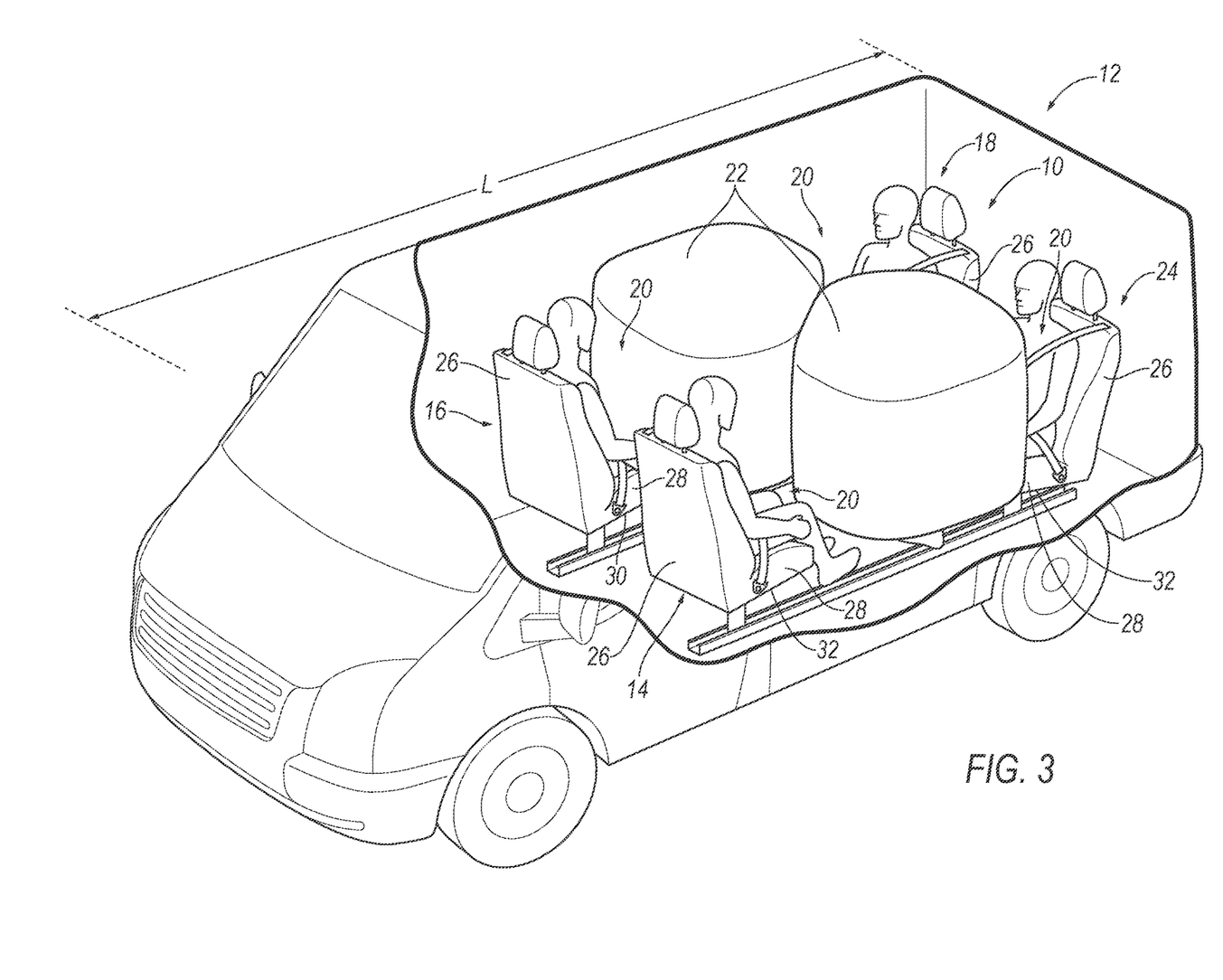
FIG. 3 is a perspective view of the vehicle having the plurality of seats with the airbag assemblies in inflated positions.
Figure 4:
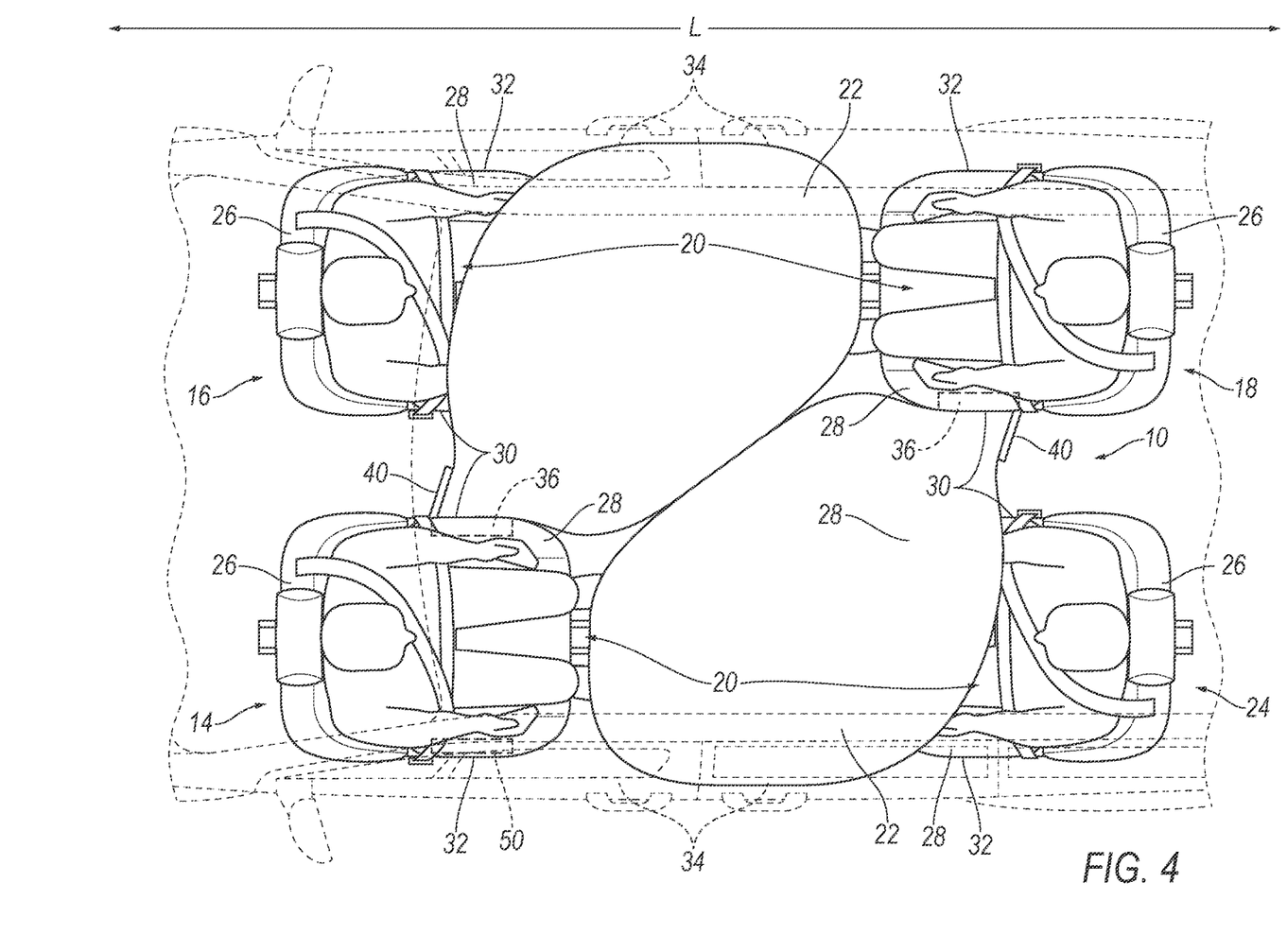
FIG. 4 is a plane view of the vehicle having the plurality of seats with the airbag assemblies in inflated positions.
Figure 5:
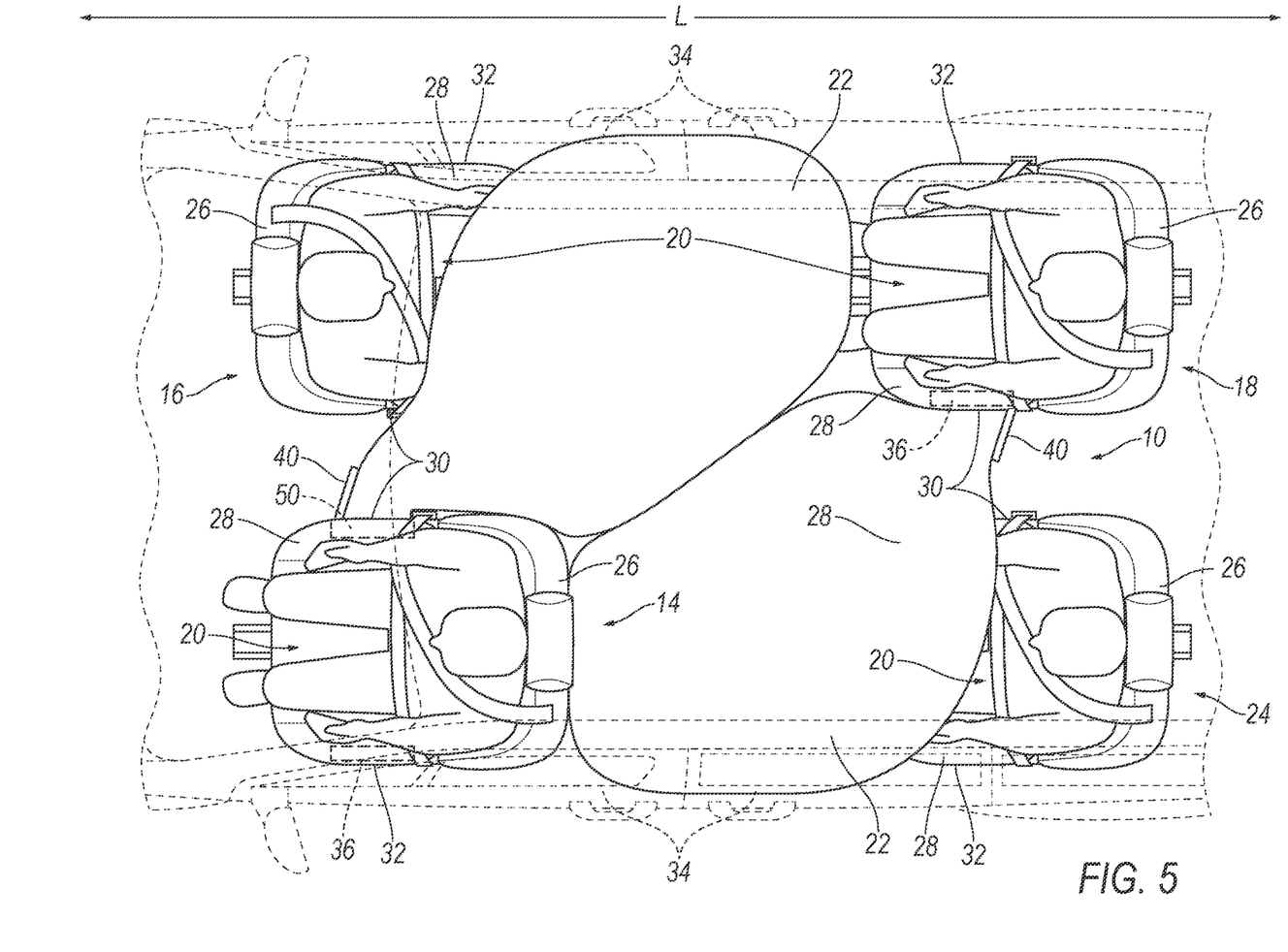
FIG. 5 is a plane view of the vehicle having the plurality of seats with the airbag assemblies in inflated positions.

With reference to FIGS. 3-5, when the airbags 22 are in the inflated position, the airbags 22 extend cross-vehicle from the seat bottom 28 of the first seat 14 and the third seat 18. The airbags 22 extends from the first seat 14 and the third seat 18 between the occupant seating areas 20 of the two seats 14, 16, 18, 24 that spaced cross-vehicle. For example, the airbag 22 supported by the first seat 14 extends cross-vehicle from the first seat 14 and toward the door 34 of the vehicle 12 opposite the first seat 14 toward the door 34, e.g., abutting the door 34. In such an example, the airbag extends between the occupant seating areas 20 of the second seat 16 and the third seat 18. The airbag 22 supported by the third seat 18 extends cross-vehicle from the third seat 18 and toward the door 34 of the vehicle 12 opposite third seat 18 toward the door 34, e.g., abutting the door 34, specifically, the door-trim panel of the door 34. In such an example, the airbag 22 extends between the occupant seating areas 20 of the first seat 14 and the fourth seat 24. The airbags 22 extend between the occupant seating areas 20 to extend between occupants seated in the seats 14, 16, 18, 24 of the vehicle 12. Extending between the occupants seated in the occupant seating areas 20 limits interaction between the occupants of the vehicle 12 in the event of an impact to the vehicle 12.

The airbags 22 extend diagonally relative to the first seat 14 and the third seat 18, i.e., vehicle-fore-and-aft and cross-vehicle. The airbag 22 supported by the first seat 14 extends in a direction opposite the direction of the airbag 22 supported by the third seat 18 when the airbags 22 are in the inflated position. In the inflated positions, the airbags 22 abut each other between the seats 14, 16, 18, 24, e.g., in the middle of the passenger compartment. The airbags 22 may use each other as reaction surfaces in the inflated position, i.e., the airbags 22 provide support to each other if an occupant contacts the airbags 22 in the inflated position.

The airbags 22 may abut at least one of the seats 14, 16, 18, 24 spaced cross-vehicle from the first seat 14 or the third seat 18. The airbag 22 supported by the first seat 14 may abut at least one of the second seat 16 or the third seat 18 in the inflated position and the airbag 22 supported by the third seat 18 may abut at least one of the first seat 14 or the third seat 18 in the inflated position.

The airbags 22 extend from the first seat 14 and the third seat 18 upwardly from the seat bottoms 28. The airbags 22 extend above the seatbacks 26 of the seats 14, 16, 18, 24 in the vehicle 12. The height of the airbags 22 allows the airbags 22 to control the kinematics of the occupants in the seats 14, 16, 18, 24 and limit interaction between the occupants seated in the seats 14, 16, 18, 24.

In some examples, the first seat 14 and/or the third seat 18 may include multiple airbag assemblies 36 spaced cross-vehicle from each other. In other words, at least one of the first seat 14 or the third seat 18 includes an airbag assembly 36 supported by the vehicle-inboard side 30 of the seat bottom 28 and a second airbag assembly 50, i.e., including another airbag 22, supported by the vehicle-outboard side 32 of the seat bottom 28. The first seat 14 and/or the third seat 18 may include a second airbag assembly 50 if the first seat 14 and/or third seat 18 is rotatable. In the example shown in the Figures, specifically FIG. 5, the first seat 14 includes a second airbag assembly 50, i.e., two airbag assemblies 36, 50, and the third seat 18 includes a single airbag assembly 36, i.e., one airbag assembly 36. The first seat 14 or the third seat 18 including a second airbag assembly 50 allows the seats 14, 18 to rotate from the forward-facing position and the rearward-facing position and provide support to the other airbag assembly 36 in both positions.

With reference to FIG. 5, the first seat 14 may rotate from the rearward-facing position to the forward-facing position. When the first seat 14 is in the forward-facing position the second airbag 22 of the second airbag assembly 50 may be on the vehicle-inboard side 30 of the seat bottom 28 of the first seat 14. In the event of an impact to the vehicle 12, the airbag 22 of the second airbag assembly 50 inflates to the inflated position instead of the airbag 22 of the other airbag assembly 36 supported on the first seat 14. The airbag 22 inflates away from the first seat 14 and toward the door 34 on the opposite side of the vehicle 12. The airbag 22 will be between the occupant seating areas 20 of the second seat 16 and the third seat 18. The adjectives "first" and "second" with respect to the airbags 22 are merely identifiers and do not indicate order or importance Each of the airbag assemblies 36, 50 may include a deflector 40 supported by the first seat 14 or the third seat 18 adjacent the airbags 22. The deflector 40 guides the airbag toward the door 34 on the opposite side of the vehicle 12. The deflector 40 contacts the airbag 22 to move the airbag between the second seat 16 and the third seat 18 or between the first seat 14 and the fourth seat 24.

The airbag 22 may be fabric, e.g., a woven polymer. For example, the fabric may be woven nylon yarn, for example, nylon 6, 6. Other examples of woven polymer include polyether ether ketone (PEEK), polyetherketoneketone (PEKK), polyester, etc. The woven polymer may include a coating, such as silicone, neoprene, urethane, etc. For example, the coating may be polyorgano siloxane.

Figure 6:
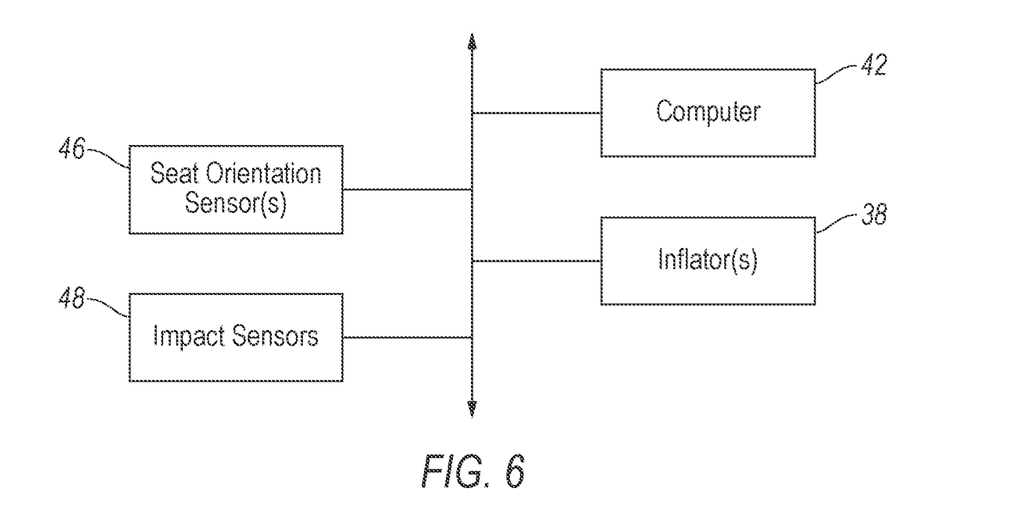
FIG. 6 is a block diagram representing a vehicle communication network of the vehicle.

The vehicle 12 includes a computer 42 includes a processor and a memory. The memory includes one or more forms of computer 42 readable media, and stores instructions executable by the computer 42 for performing various operations, including as disclosed herein. For example, the computer 42 can be a generic computer 42 with a processor and memory as described above and/or may include an electronic control unit ECU or controller for a specific function or set of functions, and/or a dedicated electronic circuit including an ASIC that is manufactured for a particular operation, e.g., an ASIC for processing sensor data and/or communicating the sensor data. In another example, computer 42 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in a computer 42. The memory can be of any type, e.g., hard disk drives, solid state drives, servers, or any volatile or non-volatile media. The memory can store the collected data sent from the sensors. The memory can be a separate device from the computer 42, and the computer 42 can retrieve information stored by the memory via a network in the vehicle 12, e.g., over a CAN bus, a wireless network, etc. Alternatively or additionally, the memory can be part of the computer 42, e.g., as a memory of the computer 42. The computer 42 may include programming to operate one or more of vehicle brakes, propulsion e.g., control of acceleration in the vehicle 12 by controlling one or more of an internal combustion engine, electric motor, hybrid engine, etc., steering, climate control, interior and/or exterior lights, etc., as well as to determine whether and when the computer 42, as opposed to a human operator, is to control such operations. Additionally, the computer 42 may be programmed to determine whether and when a human operator is to control such operations. The computer 42 may include or be communicatively coupled to, e.g., via a vehicle 12 network such as a communications bus as described further below, more than one processor, e.g., included in components such as sensors, electronic control units (ECUs) or the like included in the vehicle 12 for monitoring and/or controlling various vehicle components, e.g., a powertrain controller, a brake controller, a steering controller, etc. With reference to FIG. 6, the computer 42 is generally arranged for communications on a vehicle communication network 44 that can include a bus in the vehicle 12 such as a controller area network CAN or the like, and/or other wired and/or wireless mechanisms. Alternatively or additionally, in cases where the computer 42 actually comprises a plurality of devices, the vehicle communication network 44 may be used for communications between devices represented as the computer 42 in this disclosure. Further, as mentioned below, various controllers and/or sensors may provide data to the computer 42 via the vehicle communication network 44.

The vehicle 12 may include seat orientation sensors 46 to determine the orientation of the seats 14, 16, 18, 24, i.e., the seat orientation sensors 46 may indicate whether the seats 14, 16, 18, 24 are in the forward-facing position or the rearward-facing position. The seat orientation sensors 46 may be in communication with the computer 42. The seat orientation sensors 46 may send a signal to the computer 42 to indicate whether the seat is in the forward-facing position or the rearward-facing position. The vehicle 12 may include any suitable number of seat orientation sensors 46 to determine the orientation of multiple seats 14, 16, 18, 24 in the vehicle 12. In other words, the vehicle 12 may include a number of seat orientation sensors 46 equal to the number of seats 14, 16, 18, 24 that are rotatable in the vehicle 12.

The vehicle 12 may include at least one impact sensor 48 for sensing impact of the vehicle 12, and the computer 42 may be in communication with the impact sensors 48. The impact sensor 48 is configured to detect an impact to the vehicle 12. The impact sensor 48 may be of any suitable type, for example, post-contact sensors such as accelerometers, pressure sensors, and contact switches; and pre-impact sensors such as radar, LIDAR, and vision-sensing systems. The vision-sensing systems may include one or more cameras, CCD image sensors, CMOS image sensors, etc. The impact sensor 48 may be located at numerous points in or on the vehicle 12.

Figure 7:
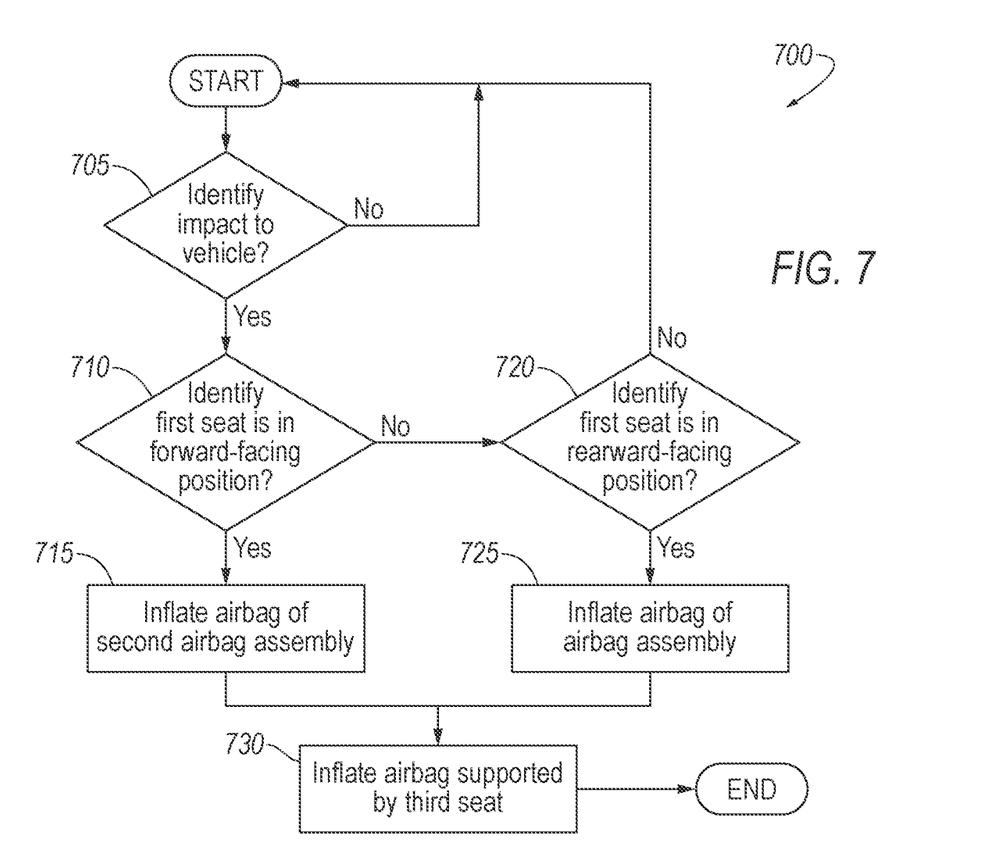
FIG. 7 is a flowchart representing a method for selectively inflating the airbag assemblies.

With reference to FIG. 7, the computer 42 stores instructions to control components of the vehicle 12 according to the method 700 shown in FIG. 7. Specifically, as shown in FIG. 7, the method 700 selectively inflates the airbags 22 supported by the first seat 14 and the third seat 18. Specifically, as shown in FIG. 7, the method 700 selectively inflates the airbags 22 supported by the first seat 14 and the third seat 18. Specifically, the method 700 selectively inflates the airbag 22 of the airbag assembly 36 or the airbag 22 of the second airbag assembly 50 based on whether the first seat 14 is forward-facing or rearward facing. Use of "in response to," "based on," and "upon determining" herein indicates a causal relationship, not merely a temporal relationship.

With reference to decision block 705, the method 700 includes identifying an impact to the vehicle 12. The computer 42 may receive a communication from the impact sensors 48 of the vehicle 12 identifying the impact to the vehicle 12. If no impact is identified, the method 700 begins from its start.

With reference to decision block 710, the method 700 includes identifying whether the first seat 14 is in the forward-facing position. Detection of the first seat 14 in the forward-facing position may be based on detection by the orientation sensor 48, as described above. As an example, the computer 42 may receive a communication from the seat orientation sensors 48 to identify the first seat 14 is in the forward-facing position. In absence of detection of the first seat 14 in the forward-facing position (including detection that the first seat 14 is in the rearward-facing position), the method 700 moves to block 720.

With reference to block 715, based on identification of vehicle impact and the first seat 14 being in the forward-facing position, the method 700 includes inflating the airbag 22 to the inflated position of the second airbag assembly 50. The computer 42 may instruct the inflator 38 to inflate the airbag 22 of the second airbag assembly 50 supported by the first seat 14. When the first seat 14 is in the forward-facing position, the airbag 22 of the airbag assembly 36 is not inflated.

With reference to decision block 720, the method 700 includes identifying whether the first seat 14 is in the rearward-facing position. Detection of the first seat 14 in the rearward-facing position may be based on detection by the orientation sensor 48, as described above. As an example, the computer 42 may receive a communication from the seat orientation sensors 48 to identify the first seat 14 is in the rearward-facing position. Merely for the purpose of illustration, decision block 720 is shown after decision block 710 in FIG. 7; decision blocks 710 may be performed simultaneously, decision block 710 may be performed before decision block 720 (as shown in FIG. 7) or after decision block 720.

With reference to block 725, based on identification of vehicle impact and the first seat being in the rearward-facing position, the method 700 includes inflating the airbag 22 of the airbag assembly 36. The computer 42 may send a communication to the inflator 38 to inflate the airbag 22 of the airbag assembly supported by the first seat 14. When the first seat 14 is in the rearward-facing position, the airbag 22 of the second airbag assembly 50 is not inflated.

With reference to block 730, the method 700 includes inflating the airbag 22 of the third seat 18 to the inflated position in response to detection of vehicle impact in block 705. The computer 42 may send a communication to the inflator 38 to inflate the airbag 22 supported by the third seat 18.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. An assembly comprising:
   a first seat;
   a second seat and a third seat spaced from each other along a vehicle-longitudinal axis, the second seat and the third seat being spaced cross-vehicle from the first seat;
   each of the second seat and the third seat defining an occupant seating area, the occupant seating area of the second seat facing the occupant seating area of the third seat; and
   an airbag supported by the first seat, the airbag extending from the first seat and being inflatable cross-vehicle between the occupant seating area of the second seat and the occupant seating area of the third seat.

2. The assembly of claim 1, wherein the first seat includes a seat bottom, the airbag being supported by the seat bottom of the first seat.

3. The assembly of claim 2, wherein the seat bottom includes a vehicle-inboard side and a vehicle-outboard side spaced cross-vehicle from the vehicle-inboard side, the airbag being supported by the vehicle-inboard side of the seat bottom of the first seat.

4. The assembly of claim 1, further comprising:
   a fourth seat spaced along the vehicle-longitudinal axis from the first seat and spaced cross-vehicle from the second seat and third seat, the fourth seat and the first seat each defining an occupant seating area;
   the occupant seating area of the fourth seat facing the occupant seating area of the first seat; and
   a second airbag supported by the third seat, the second airbag extending from the third seat and being inflatable cross-vehicle between the occupant seating area of the fourth seat and the occupant seating area of the first seat.

5. The assembly of claim 4, wherein the airbag and the second airbag are each inflatable to an inflated position, the second airbag abutting the airbag in the inflated position.

6. The assembly of claim 4, wherein the second airbag extends in a direction opposite from the airbag.

7. The assembly of claim 4, the airbag is supported by the first seat below the occupant seating area.

8. The assembly of claim 1, further comprising:
   a second airbag supported by the first seat, the second airbag being spaced cross-vehicle from the airbag and inflatable to an inflated position; and
   a computer including a processor and a memory storing instructions executable by the processor to selectively inflate the airbag or the second airbag.

9. The assembly of claim 8, wherein the first seat is rotatable about a rotational axis from a forward-facing position to a rearward-facing position and the instructions include to inflate the airbag to an inflated position when the first seat is in one of the forward-facing position or the rearward-facing position and to inflate the second airbag to the inflated position when the first seat is the other of the forward-facing position or rearward-facing position.

10. The assembly of claim 9, further comprising a third airbag supported by the third seat.

11. The assembly of claim 10, further comprising:
 a fourth seat spaced along the vehicle-longitudinal axis from the first seat and spaced cross-vehicle from the second seat and third seat;
 the first seat and the fourth seat each defining an occupant seating area, the occupant seating area of the fourth seat facing the occupant seating area of the first seat; and
 the third airbag extending from the third seat and being inflatable cross-vehicle between the occupant seating area of the fourth seat and the occupant seating area of the first seat.

12. The assembly of claim 1, further comprising a deflector supported by the first seat adjacent the airbag.

13. The assembly of claim 1, wherein the airbag is inflatable to an inflated position, the airbag abutting at least one of the second seat and the third seat in the inflated position.

14. The assembly of claim 1, further comprising a door adjacent the second seat and the third seat, the airbag being inflatable to an inflated position away from the first seat and toward the door.

15. The assembly of claim 14, wherein the airbag abuts the door in the inflated position.

16. The assembly of claim 1, wherein the airbag inflates diagonally from the first seat.

17. The assembly of claim 1, wherein the first seat includes a seat bottom and a seatback supported by the seat bottom, the airbag being supported by the seat bottom and being inflatable upwardly from the seat bottom and above the seatback.

* * * * *